July 15, 1969   J. PICKLES   3,455,174
WINDOW REGULATOR MOTOR AND TRANSMISSION HOUSING
Filed April 11, 1967
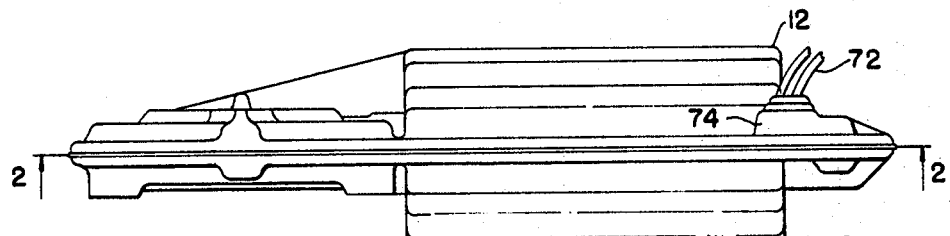
FIG.1
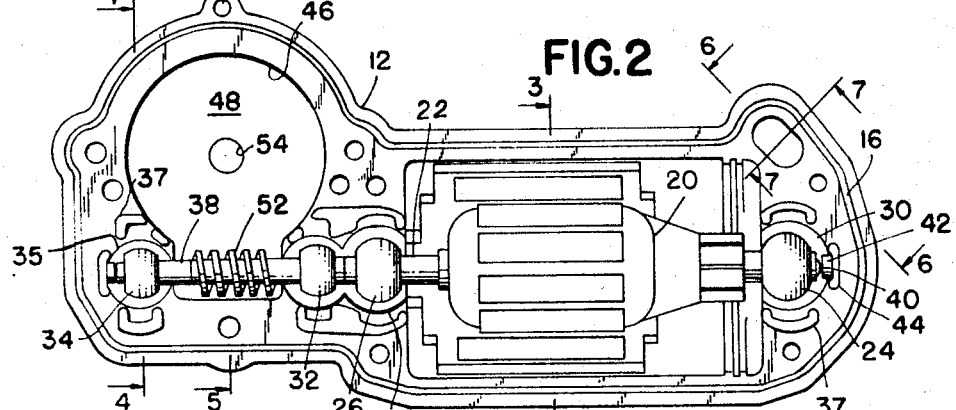
FIG.2
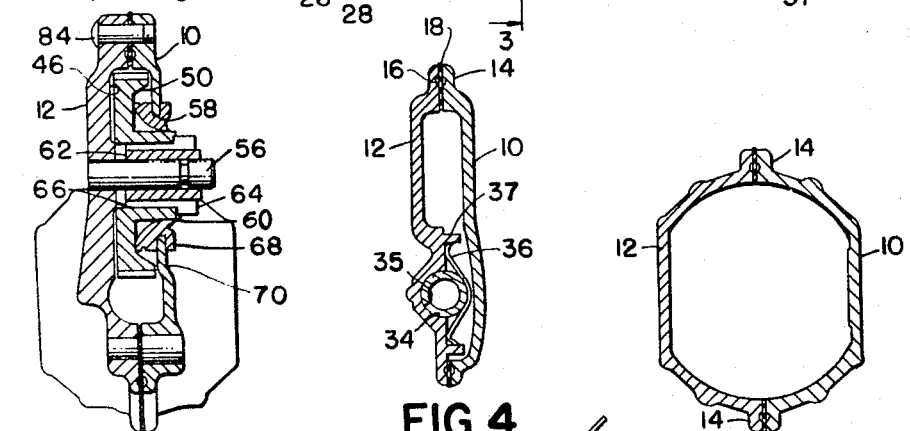
FIG.5   FIG.4   FIG.3
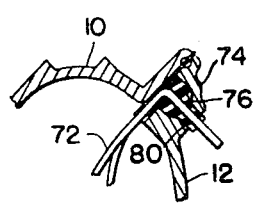 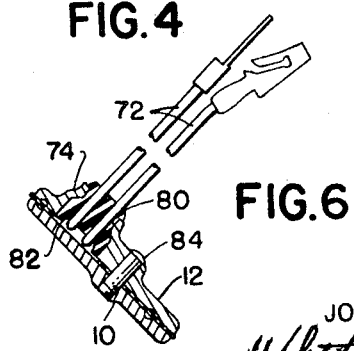
FIG.7   FIG.6
INVENTOR
JOSEPH PICKLES
BY *Whittemore*
*Hulbert & Belknap*
ATTORNEYS 3,455,174
WINDOW REGULATOR MOTOR AND
TRANSMISSION HOUSING
Joseph Pickles, Bloomfield Hills, Mich., assignor to Ferro Manufacturing Corporation, Detroit, Mich., a corporation of Michigan
Filed Apr. 11, 1967, Ser. No. 630,013
Int. Cl. F16h 29/20
U.S. Cl. 74—89.14                              6 Claims

ABSTRACT OF THE DISCLOSURE

A two-piece housing for receiving and supporting an electric motor, a worm driven by the electric motor, a worm gear in mesh with the worm, and a pinion located exteriorly of the housing but fixed internally of the housing to the worm, and the combination of components.

Cross-reference to related application

The transmission between the electric motor and the worm is disclosed in copending application Ser. No. 630,089 filed Apr. 11, 1967.

Summary of the invention

The invention has for its principal object the provision of a complete housing formed of two separable parts adapted to receive and support within the housing an electric motor, a worm connected to the motor, a worm gear in mesh with the worm, and a pinion exterior of the housing but having a portion extending into the housing for attachment to the worm gear.

It is an object of the present invention to provide the combination of a compact simplified two-piece housing essentially in the form of a casting adapted to receive and support operating members of the drive assembly for a vehicle window regulator.

Other objects and features of the invention will become apparent as the description proceeds, especially when taken in conjunction with the accompanying drawings, illustrating a preferred embodiment of the invention.

Brief description of the drawing

FIGURE 1 is an elevational view of the housing in assembled relation.

FIGURE 2 is a view of one of the housing members with the other member separated therefrom.

FIGURE 3 is a sectional view of the housing only, taken on the line 3—3, FIGURE 2.

FIGURE 4 is a sectional view of the housing only, taken on the line 4—4, FIGURE 2.

FIGURE 5 is a sectional view of the housing including some operating components therein, taken on the line 5—5, FIGURE 2.

FIGURE 6 is a fragmentary sectional view on the line 6—6, FIGURE 2.

FIGURE 7 is a fragmentary sectional view on the line 7—7, FIGURE 2.

Description of the preferred embodiment

Referring now to the drawing, the housing comprises generally similar but not identical housing sections 10 and 12, these sections having mating flange portions 14 best illustrated in FIGURES 3 and 4; these flange portions having flat surfaces provided with a continuous channel 16 extending completely around the periphery of each of the housing sections 10 and 12. In assembly, a gasket 18 is provided having an intermediate bead received in the continuous channel 16 to provide a permanent seal.

The interior of both sections of the housing is provided with support portions for locating and supporting operating components of the device. For example, the armature 20 of the motor is connected to a shaft section 22, adjacent end portions of the shaft being supported in bearings 24 and 26 which are suitably supported in recessed bearing support portions 28 and 30. Bearings 32 and 34 are similarly mounted as illustrated, the recess 35 for bearing 34 being seen in section in FIGURE 4. The bearings 24, 26, 32 and 34 are retained in the recesses provided in the housing section 12 by retainer clips 36, as best seen in FIGURE 4. The ends of the clips are reversely bent and engage flange-like projections 37 formed in the housing sections. The bearings 32 and 34 together support a shaft section 38 and the shaft sections 22 and 38 are supported against endwise movement by thrust bearings 40 engaging bearing plates 42 supported by projections 44 at the interior surface of the housing section.

As best seen in FIGURE 5, the housing sections include matching generally cylindrical cavities 46 which define a housing cavity 48 adapted to receive a worm gear 50 in mesh with a worm 52 carried by the shaft section 38. One of the housing sections, as for example the section 10 as seen in FIGURES 2 and 5, is provided with an opening 54 into which a shaft 56 is pressed so as to provide a firm rotary support for the worm gear 50. The remaining housing section 12 is provided with a substantially larger opening 58 through which a collar portion 60 of the worm gear 50 extends. Received within the collar portion 60 of the worm gear is a hub portion 62 of a pinion 64, the parts being splined together as indicated at 66. The interior of the housing is sealed by means of an annular gasket 68 having a groove receiving a flange 70 of the housing section 12 which surrounds the opening 58, the gasket having lips engaging with a side of the worm gear and with the exterior of its collar portion 60.

Means are provided for leading electrical wires or conduits 72 into the interior of the housing for connection to the electric motor including the armature 20, and this construction is best illustrated in FIGURES 6 and 7. The housing section 12 is provided with a projection 74 which is hollow as indicated at 76, and communicates through an opening 80 to the exterior of the housing section. The lead wires 72 extend through the opening and are permanently assembled in the opening by means of injecting or casting a suitable sealant 82 in place.

With the foregoing construction it will be apparent that the housing constitutes an exceptionally simple compact unit formed of two assembles adapted to be secured together by assembly screws, some of which are illustrated at 84 in the several figures. The interior of the housing is completely sealed and the electrical leads extending into the interior are not only sealed but are peramently locked in place. On the other hand, the external window regulator operating pinion 64 extends through a sealed opening into the interior of the housing where it is fixed to the worm gear 50.

The drawing and foregoing specification constitute a description of the improved window regulator motor and transmission housing in such full, clear, concise and exact terms as to enable any person skilled in the art to practice the invention, the scope of which is indicated by the appended claims.

What I claim as my invention is:

1. A window regulator actuator comprising a two-section housing, said sections having matching flat-surfaced flange portions each occupying a plane and extending completely around said sections, said sections having matching generally semi-cylindrical recesses together forming a first generally cylindrical motor chamber, a motor in said chamber, said sections having matching generally cylindrical recesses together forming a second generally cylindrical chamber for a worm gear, said second chamber having its axis substantially perpendicular to the axis of said motor chamber, a worm gear in said second chamber, said sections having matching recesses affording space for a worm in communication with said second chamber, a worm in said space in mesh with said worm gear and connected to be driven directly by said motor, one of said sections having a mounting post fixedly secured thereto extending centrally through said second chamber and rotatively supporting said worm gear, said other section having an enlarged opening in alignment with said post, said worm gear having an output pinion gear fixedly connected thereto and located outwardly of said opening.

2. Structure as defined in claim 1 in which said one section has a continuous flange around said opening, and a sealing gasket carried by said flange and engaging a circular portion of one of saids gear located in said opening.

3. Structure as defined in claim 1, shaft bearing recesses formed in one of said sections having spaced abutments at opposite sides thereof, shaft bearings in said bearing recesses, shaft means in said recesses connecting said motor and said worm, and bearing retainers engaging said spaced abutments and the bearings therebetween.

4. Structure as defined in claim 3, said retainer comprising spring clips.

5. Structure as defined in claim 1 comprising shaft means including a motor shaft and a worm supporting shaft coupled thereto, and thrust bearing means in one of said sections engaged by an end of said shaft.

6. Structure as defined in claim 1, said flange portions each having matching continuous channels in the flat surface thereof, and a continuous flat gasket interposed between said flat surfaces and having a bead received in said channels.

References Cited
UNITED STATES PATENTS

| | | | |
|---|---|---|---|
| 192,884 | 7/1877 | Ubil | 277—169 X |
| 1,720,514 | 7/1929 | Dresser. | |
| 1,817,216 | 8/1931 | Uggla | 74—421 X |
| 2,379,273 | 6/1945 | Bluemink et al. | 74—425 |
| 2,905,003 | 9/1959 | Meyer et al. | 74—89.14 |
| 2,989,995 | 6/1961 | Happe | 143—157 |
| 3,339,270 | 9/1967 | Walton et al. | 74—606 |

ROBERT A. O'LEARY, Primary Examiner

WILLIAM E. WAYNER, Assistant Examiner

U.S. Cl. X.R.

74—606